United States Patent [19]

Shinzawa et al.

[11] Patent Number: 4,608,640
[45] Date of Patent: Aug. 26, 1986

[54] TRAP REGENERATIVE DEVICE CONTROL APPARATUS

[75] Inventors: Motohiro Shinzawa, Yokosuka; Yoji Hasegawa, Yokohama, both of Japan

[73] Assignee: Nissan Motor Company, Limited, Japan

[21] Appl. No.: 569,481

[22] Filed: Jan. 9, 1984

[30] Foreign Application Priority Data

Jan. 10, 1983 [JP] Japan .................................. 58-1127
Jan. 14, 1983 [JP] Japan .................................. 58-3524

[51] Int. Cl.[4] .......................... F01N 3/28; B01D 46/42
[52] U.S. Cl. ................... 364/431.03; 55/283; 60/286; 60/311
[58] Field of Search .................. 60/274, 286, 311; 55/DIG. 10, DIG. 30, 282, 283; 73/38; 364/431.03

[56] References Cited

U.S. PATENT DOCUMENTS

| 4,281,512 | 8/1981 | Mills | 55/283 |
| 4,424,671 | 1/1984 | Tokura | 60/274 |
| 4,450,682 | 5/1984 | Sato et al. | 60/286 |
| 4,492,079 | 1/1985 | Takagi et al. | 60/274 |

FOREIGN PATENT DOCUMENTS

| 55-12029 | 1/1979 | Japan . | |
| 0153384 | 12/1979 | Japan | 55/283 |
| 55-57637 | 4/1980 | Japan . | |
| 0072213 | 6/1981 | Japan | 55/DIG. 30 |
| 56-115809 | 9/1981 | Japan . | |
| 0210115 | 12/1982 | Japan | 60/311 |
| 0212314 | 12/1982 | Japan | 60/286 |

*Primary Examiner*—Parshotam S. Lall
*Attorney, Agent, or Firm*—Lowe, Price, Leblanc, Becker & Shur

[57] ABSTRACT

An apparatus controls the operation of a regenerative device for generating a quantity of heat to burn the exhaust particles collected in a trap located in the exhaust conduit of an internal combustion engine. The apparatus is responsive to the pressures on the inlet and outlet sides of the trap for calculating a pressure differential across the trap and a threshold value for comparison therewith as a function of the pressure on the inlet side of the trap. The apparatus operates the regenerative device to regenerate the trap when the pressure differential across the trap reaches the calculated threshold value.

28 Claims, 19 Drawing Figures

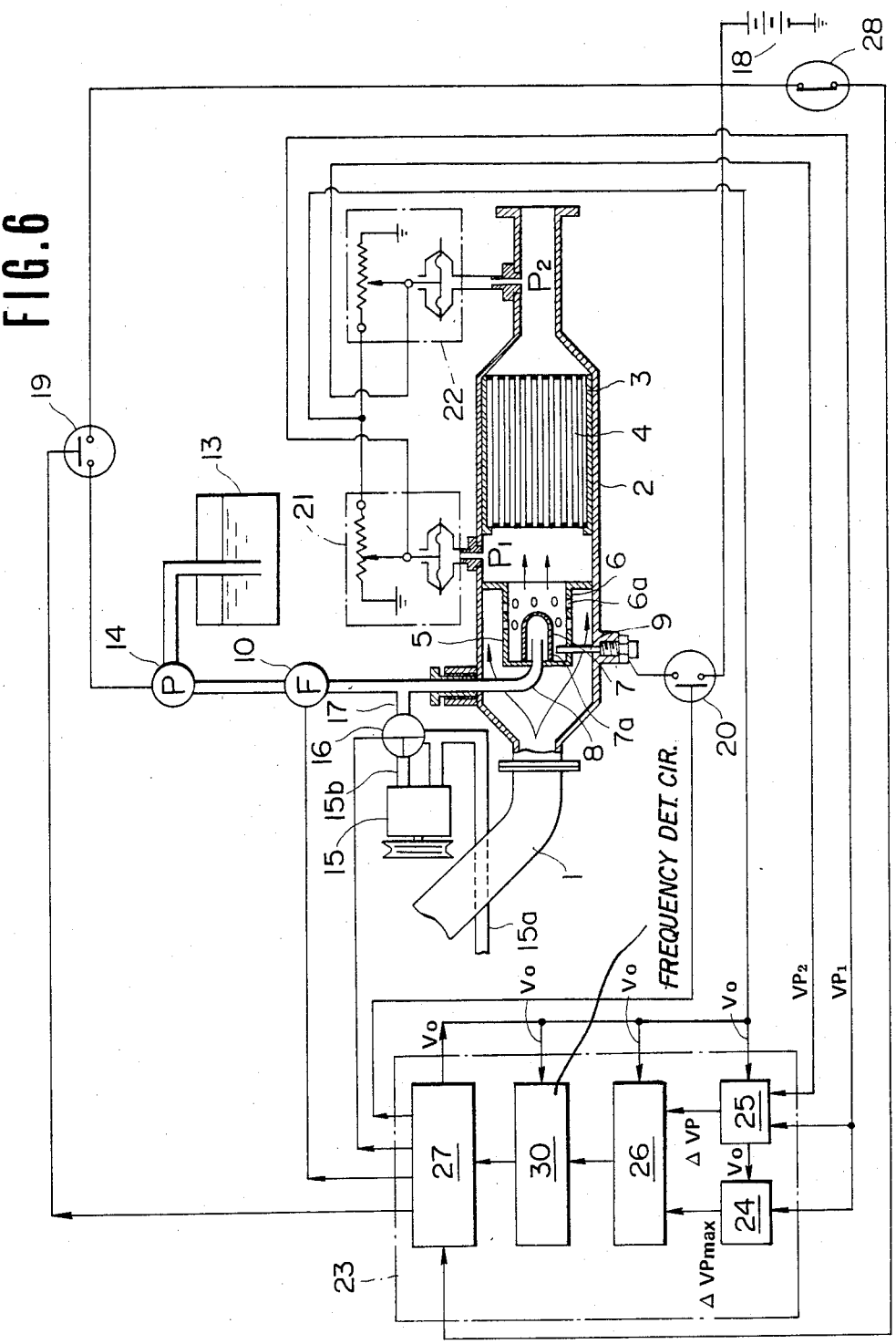

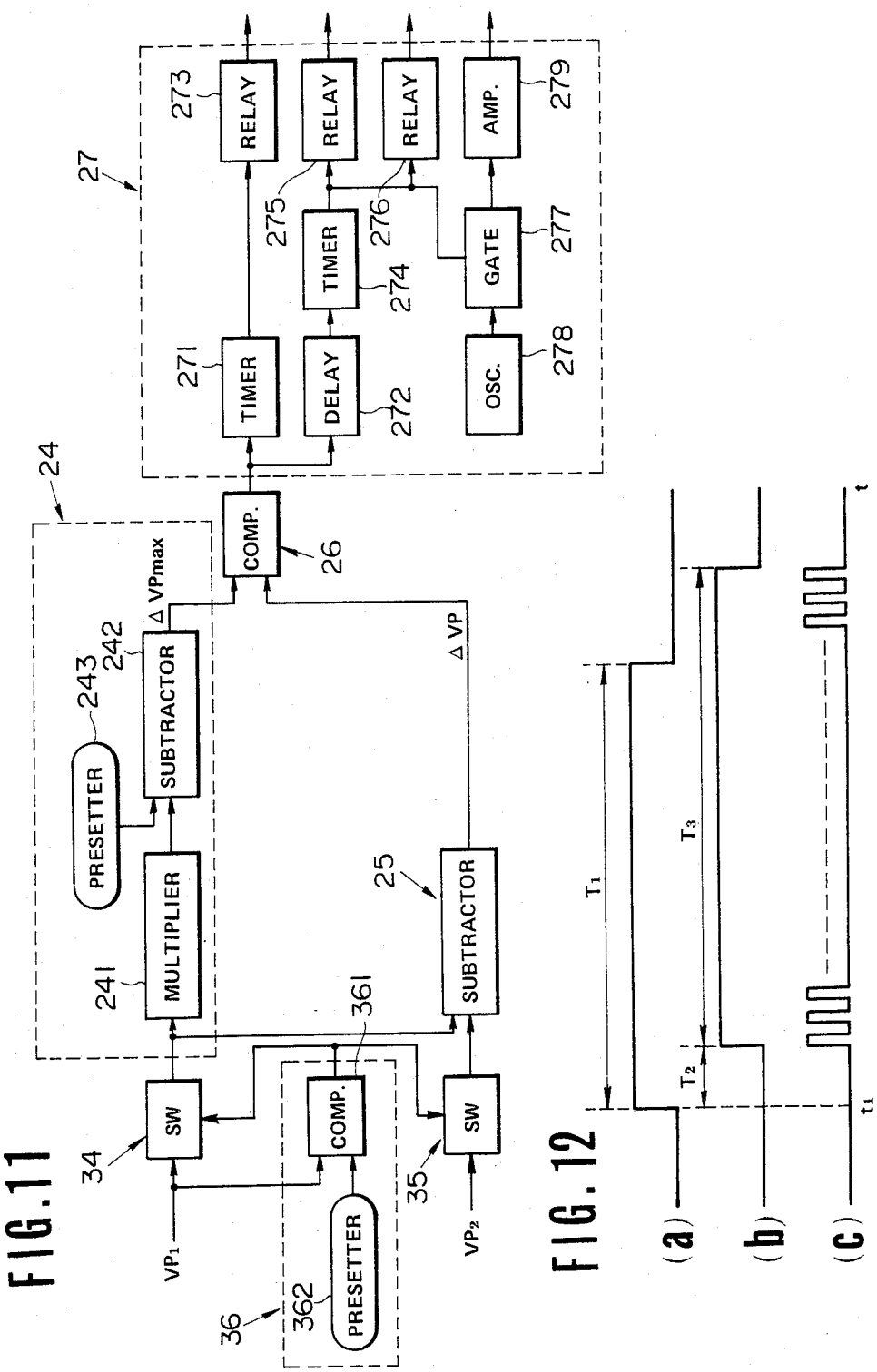

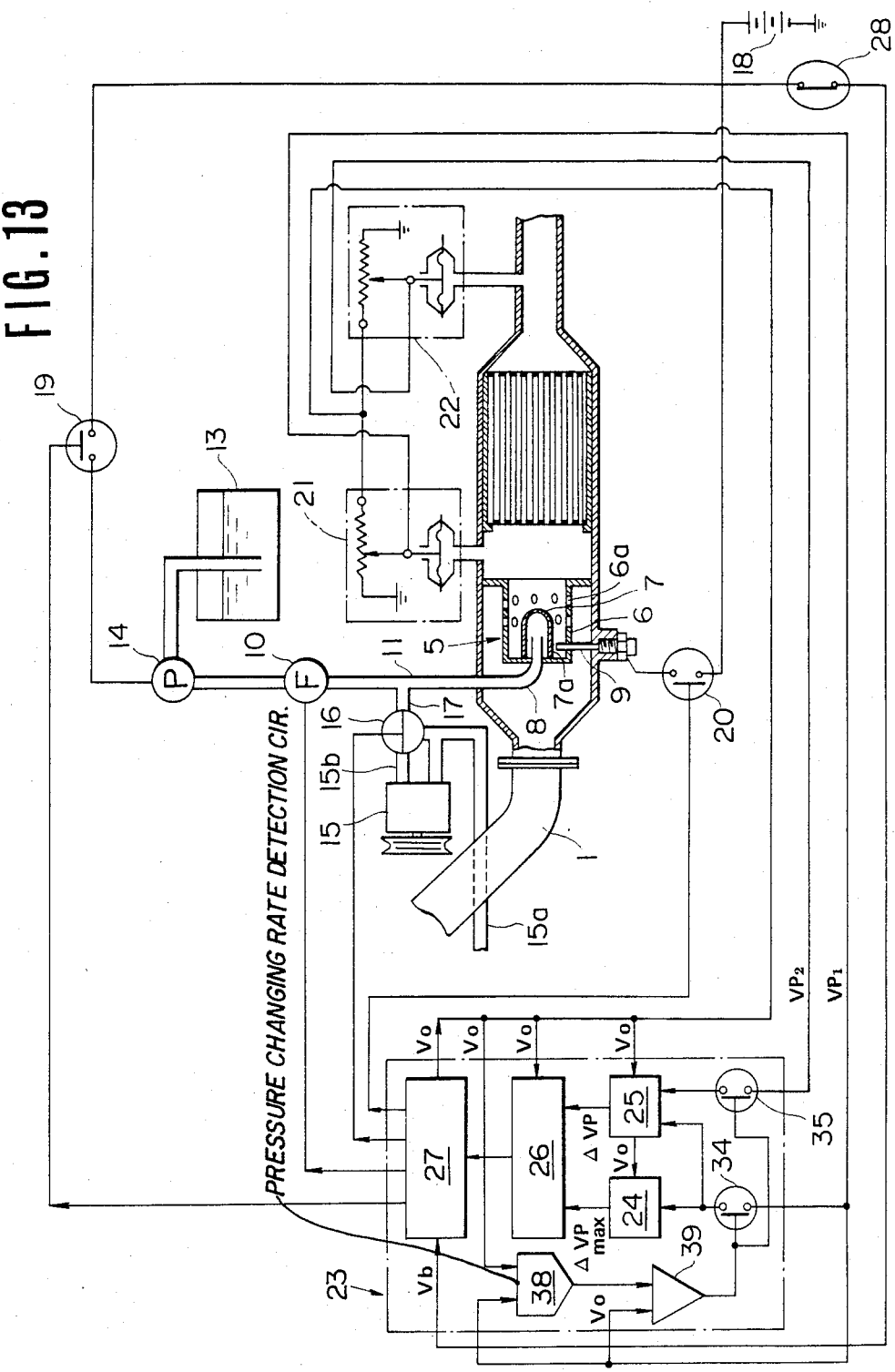

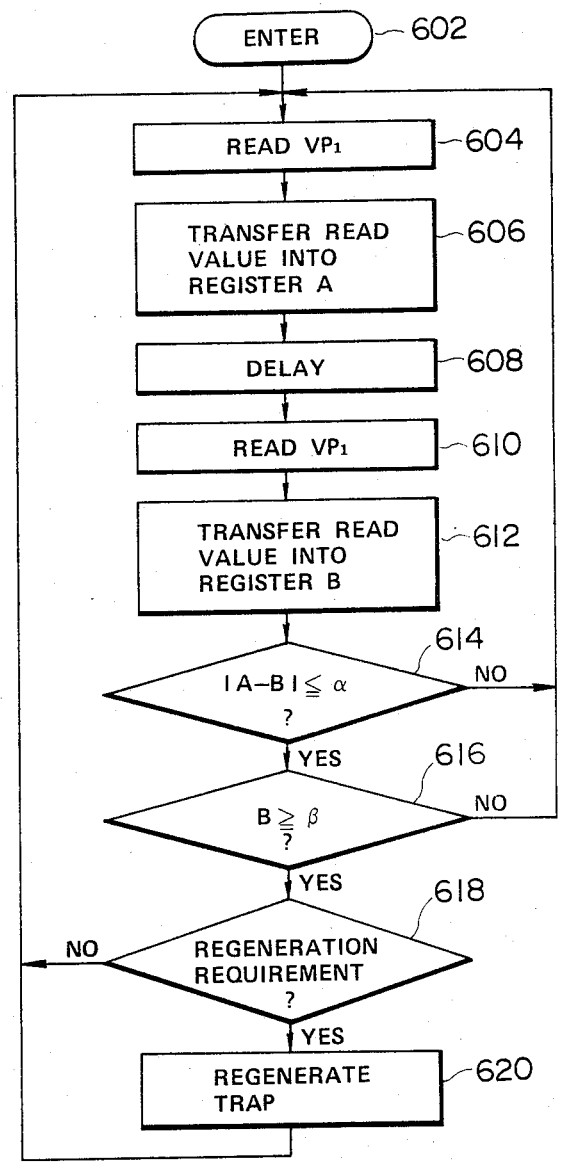

TRAP REGENERATIVE DEVICE CONTROL APPARATUS

BACKGROUND OF THE INVENTION

This invention relates to an apparatus for controlling the operation of a regenerative device to generate a quantity of heat so as to burn the exhaust particles collected in a trap located in the exhaust conduit of an internal combustion engine.

It has been proposed to purify exhaust gases from an automobile internal combustion engine by employing a trap located in the exhaust conduit of the engine to collect therein carbon or other particles of the exhaust gases. A regenerative burner is repetitively operated to burn the particles collected in the trap so as to regenerate the trap each time a regeneration requirement occurs. The regeneration requirement is determined by the pressure differential across the trap reaching a predetermined value or the pressure on the inlet side of the trap reaching a value determined based upon engine operating parameters.

One difficulty encountered with such a conventional purifying device is lack of accuracy in controlling the trap regeneration. The pressure on the inlet side of the trap and thus the pressure differential across the trap varies with variations in the rate of exhaust gas flow to the trap and the presence of an EGR system in the engine. As a result, the trap regeneration occurs sometimes with an advance causing waste of fuel in the burner and sometimes with a delay causing an abnormal rise in the exhaust gas pressure to degrade engine drivability.

Therefore, the present invention provides a trap regenerative device control apparatus which can increase the accuracy of detection of a regeneration requirement for the trap.

SUMMARY OF THE INVENTION

There is provided, in accordance with the present invention, an apparatus for use in an internal combustion engine having an exhaust conduit for discharging exhaust particles together with exhaust gases to the atmosphere, and a trap located in the exhaust conduit for controlling exhaust particles. The apparatus comprises regenerative means operable to generate a quantity of heat to burn the exhaust particles collected in the trap so as to regenerate the trap. Sources are provided for deriving signals indicative of (a) the pressure (P1) on the inlet side of the trap and (b) the pressure (P2) on the outlet side of the trap. The signals indicative of (a) and (b) are applied to control means which detects a regeneration requirement to operate the regenerative means for a predetermined time period. The control means includes means for calculating a pressure differential ($\Delta P$) across the trap based upon the values of the signals indicative of (a) and (b), means for calculating a threshold value ($\Delta Pmax$) as a function of the signal indicative of (a), and means for comparing the calculated pressure differential ($\Delta P$) with the calculated threshold value ($\Delta Pmax$) to detect a regeneration requirement when the calculated pressure differential ($\Delta P$) reaches the calculated threshold value ($\Delta Pmax$).

BRIEF DESCRIPTION OF THE DRAWINGS

Embodiments of the apparatus of the invention, and methods of operation thereof will now be described by reference to the following specification taken in connection with the accompanying drawings.

For a better understanding of the invention, frequent reference will be made to the drawings wherein:

FIG. 6 is a schematic block diagram partially in section showing a modification of the embodiment of FIG. 2;

FIG. 11 is a schematic block diagram showing the details of the control unit of FIG. 10;

FIG. 12 contains three waveforms 12a, 12b and 12c obtained at various points in the schematic diagram of FIG. 11;

FIG. 13 is a schematic block diagram partially in section showing a modification of the embodiment of FIG. 10;

FIG. 15 is a flow diagram illustrative of the operation of the digital computer used in the control unit of FIG. 14.

DESCRIPTION OF THE PREFERRED EMBODIMENTS

Figure 1:
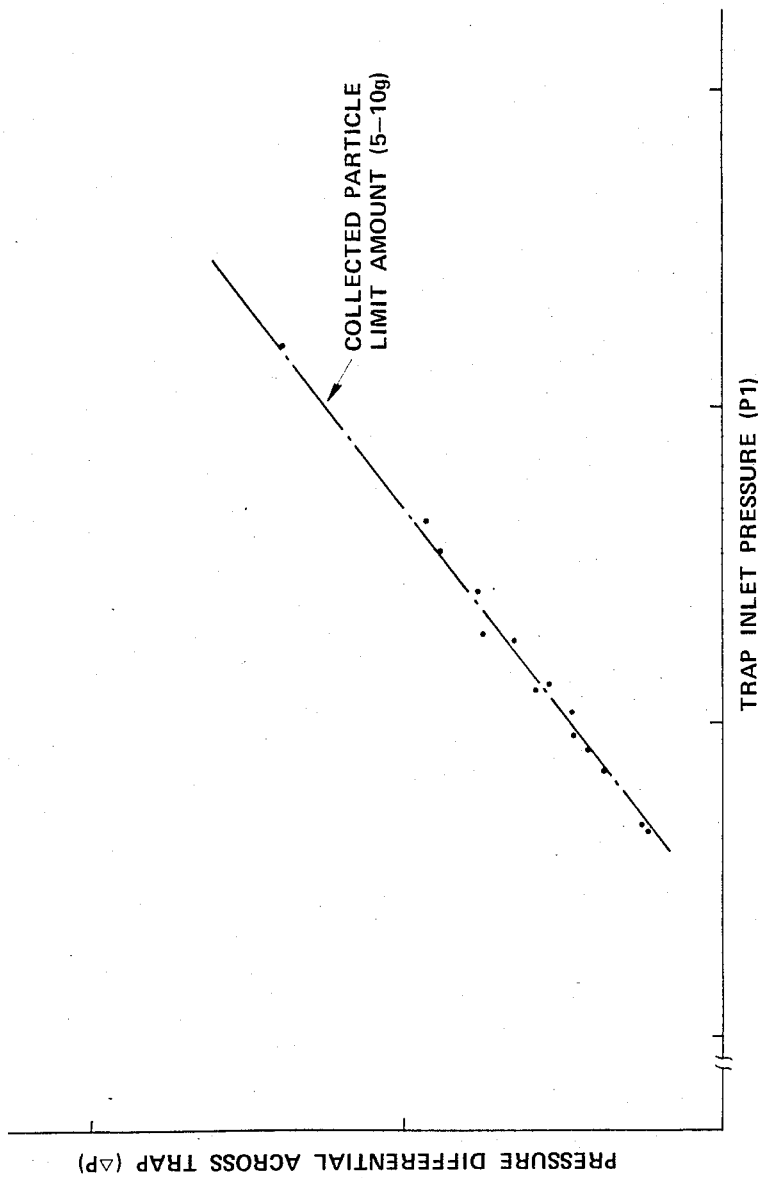
FIG. 1 is a graph plotting the pressure differential across a trap with respect to given pressures on the inlet side of the trap.

Before describing the specific structural details of the trap regeneration control apparatus of the present invention, the principle of determination of a regeneration requirement will be described with reference to the graph of FIG. 1 to provide a basis for a better understanding of the function of the trap regeneration control apparatus.

A honeycomb trap is similar to a laminar flow meter in that for the same amount of the particles collected in the trap, a linear relationship exists between the pressure at the inlet side of the trap and the pressure differential across the trap. In FIG. 1, we have plotted the pressure differential ($\Delta P = P1 - P2$) existing across the trap against the pressure (P1) created on the inlet side of the trap under a condition where the amount of the particles collected in the trap reaches a limit, for example, 5 g to 10 g, at which limit the burner is required to operate to regenerate the trap. The results show that the pressure differential ($\Delta Pmax$) existing across the trap when the amount of the particles collected in the trap reaches the limit is maintained in a linear relationship with respect to the pressure (P1) on the inlet side of the trap, the linear relationship being expressed by the equation as follows:

$$\Delta P_{max} = A \cdot P_1 - B \quad (1)$$

wherein A and B are constants.

Therefore, it can be seen that the regeneration requirement can be determined by comparing the pressure differential ($\Delta P$) across the trap with the threshold pressure differential value ($\Delta P_{max}$) given by equation (1). In this case, the control apparatus operates the burner to regenerate the trap when the pressure differential ($\Delta P$) across the trap exceeds the threshold pressure differential value ($\Delta P_{max}$). The regeneration requirement may be determined by comparing the ratio ($\Delta P/P_1$) of the pressure differential ($\Delta P$) to the pressure ($P_1$) on the inlet side of the trap or the ratio ($P_2/P_1$) of the pressure ($P_2$) on the outlet side of the trap to the pressure ($P_1$) on the inlet side of the trap with a predetermined value. In this case, the control apparatus operates the burner to regenerate the trap when the ratio ($\Delta P/P_1$) or ($P_2/P_1$) exceeds the predetermined value.

Figure 2:
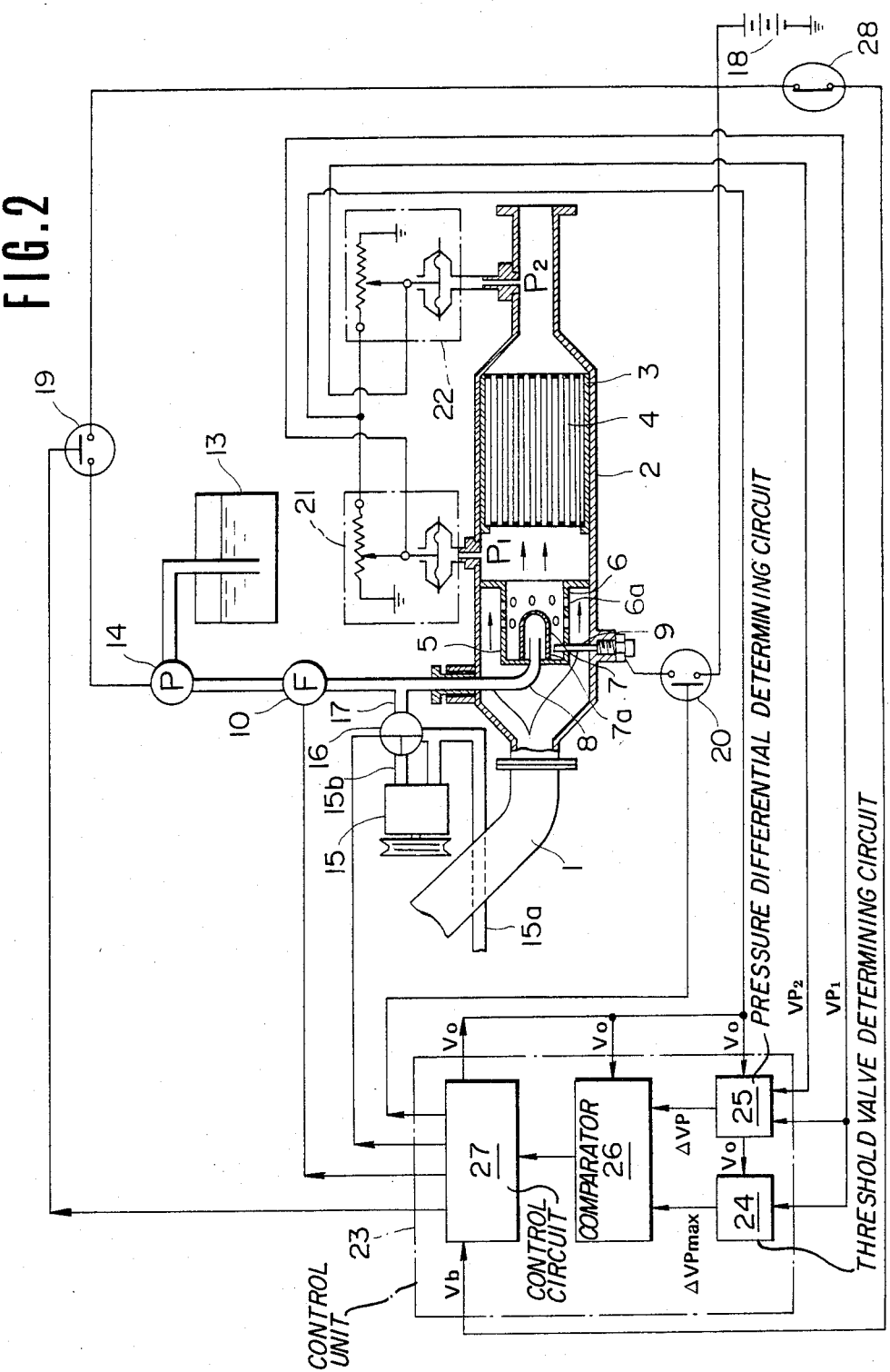
FIG. 2 is a schematic block diagram partially in section showing one embodiment of a trap regenerative device control apparatus of the present invention.

Referring to FIG. 2, there is illustrated one embodiment of a trap regeneration control apparatus made in accordance with the present invention. A trap casing 2 is connected at its inlet end to the exhaust conduit 1 of an internal combustion engine. The trap casing 2 contains a trap or particle filter 4 secured through a buffer member 3 on the inner surface of the trap casing 2. The trap 4 has a honeycomb structure in which a first multiplicity of passageways closed at their inlet ends and a second multiplicity of passageways closed at their outlet ends are arranged alternatively so that exhaust particles can be collected therein while exhaust gases pass through the walls of the adjacent passageways.

A regenerative burner, which is generally designated at 5, is located within the trap casing 2 and is actuated to burn the particles collected in the trap 4 so as to regenerate the trap when a predetermined amount of particles is collected in the trap 4. The regenerative burner 5 includes a combustion cylinder 6 formed in its peripheral wall with a number of through-holes 6a through which exhaust gases enter the interior of the combustion cylinder 6. The combustion cylinder 6 contains a reverse-flow evaporation cylinder 7 which is formed in its peripheral wall with tiny flame jets 7a. An air-fuel mixture conduit 8 opens into the reverse-flow evaporation cylinder 7. The mixture conduit 8 communicates through a three-way valve 16 with the outlet side of an air pump 15 and also through a fuel injection valve 10 to a fuel pump 14 which is actuated to supply fuel from a fuel tank 13 to the fuel injection valve 10 when a relay controlled switch 19 is closed on command from a control unit 23 to connect the fuel pump 14 to a battery 18. The fuel injection valve 10 receives fuel injection pulses from the control unit 23 and operates to supply fuel into the mixture conduit 8. The three-way valve 16 is movable between two positions, the first position resulting in connection between the inlet and outlet sides of the air pump 15. The second position is encountered on command from the control unit 23 to disconnect the inlet and outlet sides of the air pump 15 and at the same time connect the air pump outlet side to the mixture conduit 8 so as to supply air into the mixture conduit 8 where it is mixed with the fuel supplied through the fuel injection valve 10.

A glow plug 9 is located in the combustion cylinder 6 near the flame jet 7a of the reverse-flow evaporation cylinder 7 and is actuated to increase the temperature in the combustion cylinder 6 to a level sufficient to ignite an air-fuel mixture therein when a relay controlled switch 20 is closed on command from the control unit 23 to connect the glow plug 9 to the battery 18.

A first pressure sensor 21, which includes a diaphragm device and a piezoelectric element shown as a potentiometer, measures the pressure ($P_1$) on the inlet side of the trap 4 in the trap casing 2 and provides a voltage signal ($V_{P1}$) indicative of the measured pressure ($P_1$) to the control unit 23. Similarly, a second pressure sensor 22, which includes a diaphragm device and a piezoelectric element shown as a potentiometer, measures the pressure ($P_2$) on the outlet side of the trap 4 in the trap casing 2 and provides a voltage signal ($V_{P2}$) indicative of the measured pressure ($P_2$) to the control unit 23. The use of these diaphragm devices can minimize the influence of exhaust gas heat on the pressure measurements.

The control unit 23 comprises a threshold value determining circuit 24 which has an input from the first pressure sensor 21 and generates at its output a voltage signal ($\Delta V_{Pmax}$) indicative of a threshold value of pressure differential across the trap 4. The output of the threshold value determining circuit 24 is coupled to one input of a comparator 26 which has another input from a pressure differential determining circuit 25. The pressure differential determining circuit 25 has an input from the first pressure sensor 21 and another input from the second pressure sensor 22 and generates at its output a voltage signal ($\Delta V_P$) indicative of pressure differential ($P_1 - P_2$) existing across the trap 4. The comparator 26 compares the voltage signal ($\Delta V_P$) from the pressure differential determining circuit 25 with the voltage signal ($\Delta V_{Pmax}$) from the threshold value determining circuit 24 and generates at its output a command signal (high signal) when the former is equal to or greater than the latter; that is, when the pressure differential existing across the trap 4 reaches the threshold value. The output of the comparator 26 is coupled to a control circuit 27 which closes the relay switches 19 and 20, operates the fuel injection valve 10, and changes the three-way valve 16 to the second position in response to the command signal from the comparator 26.

The control circuit 27 includes a constant-voltage circuit connected through the engine key switch 28 to the battery 18 to supply a constant voltage ($V_o$) to the power terminals of the threshold value determining circuit 24, the pressure differential determinating circuit 25, the two sensors 21 and 22 and the comparator 26.

Figure 3:
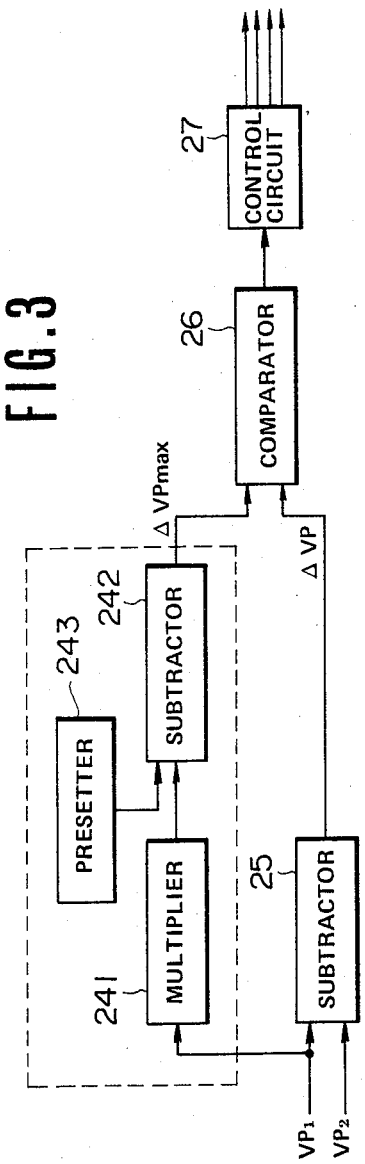
FIG. 3 is a schematic block diagram showing the details of the control unit of FIG. 2.

As shown in FIG. 3, the threshold value determining circuit 24 may be comprised of a multiplier 241, a subtractor 242, and a preset circuit 243. The multiplier 241 multiplies the output voltage ($V_{P1}$) of the first pressure sensor 21 by a constant A and generates at its output a voltage signal ($A \cdot V_{P1}$) indicative of the resulting product. The output of the multiplier 241 is coupled to one input of the subtractor 242 which has another input from the preset circuit 243. The subtractor 242 subtracts a constant B preset in the preset circuit 243 from the voltage signal ($A \cdot V_{P1}$) applied thereto from the multiplier 241 and generates at its output a voltage signal ($\Delta V_{Pmax}$) indicative of the resulting difference ($A \cdot V_{P1} - B$). In addition, the pressure differential determinating circuit 25 may be comprised of a subtractor which subtracts the output voltage ($V_{P2}$) of the second pressure sensor 22 from the output voltage ($V_{P1}$) of the first pressure sensor 21 and generates a voltage signal ($\Delta V_P$) indicative of the resulting difference.

Figure 4:
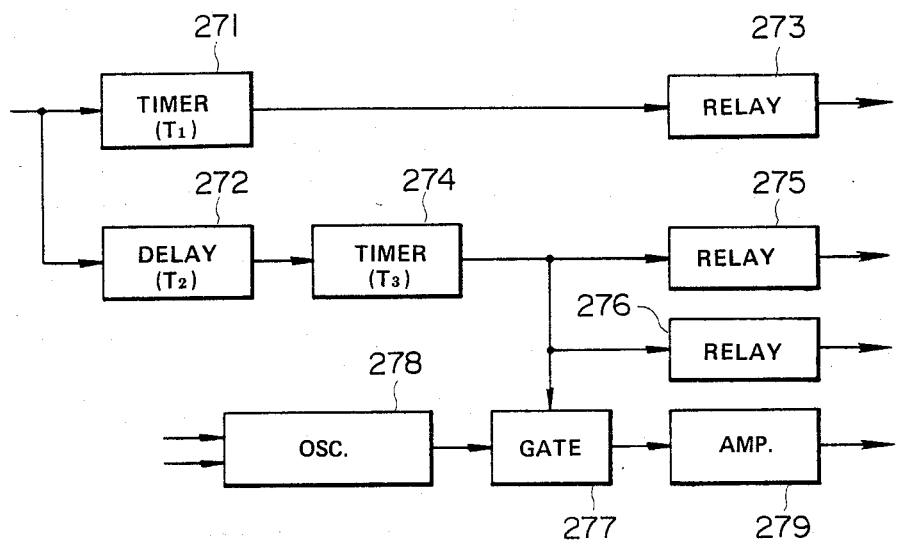
FIG. 4 is a schematic block diagram showing the details of the control circuit of FIG. 3.

Referring to FIG. 4, the control circuit 27 includes a first timer 271 which is connected at its input to the output of the comparator 26. The output of the first timer 271 is coupled to a relay 273 which controls the relay switch 20. The first timer 271 is responsive to a command signal (high signal) from the comparator 26 to energize the relay 273 so as to close the relay switch 20, causing actuation of the glow plug 9 for a predetermined period of time (T1) after the application of the command signal from the comparator or in response to the leading edge of the command signal from the comparator 26.

The control circuit 27 also includes a second timer 274 which is connected at its input to the output of the comparator 26 through a delay circuit 272. The output of the second timer 274 is coupled to a relay 275 which controls the three-way valve 16 and to a relay 276 which controls the relay switch 19. The delay circuit 272 delays application of the command signal to the second timer 274 by a predetermined time (T2). The second timer 274 is responsive to the command signal fed thereto through the delay circuit 272 to energize the relay 275 so as to shift the three-way valve 16 to the second position supplying air to the mixture conduit 8 and also to energize the relay 276 so as to close the relay switch 19, causing the fuel pump 14 to start the supply of fuel to the fuel injection valve 10.

The output of the second timer 274 is also coupled to a gate circuit 277 which is responsive to a high signal from the second timer 274 to allow the passage of fuel injection pulses from a pulse generator 278 to an amplifier 279. The output of the amplifier 279 is coupled to the fuel injection valve 10 which receives the fuel injection pulses and operates to supply fuel into the mixture conduit 8.

Figure 5:
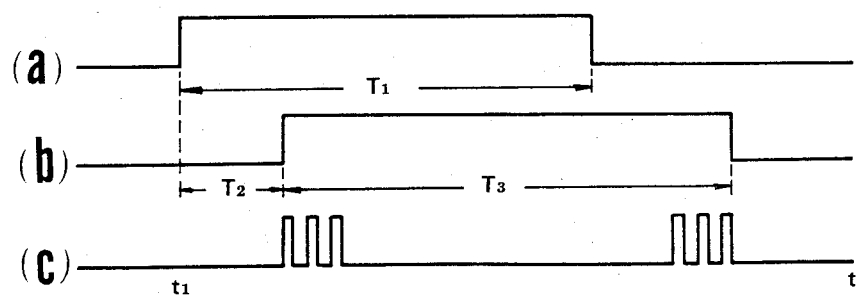
FIG. 5 contains three waveforms 5a, 5b and 5c obtained at various points in the schematic diagram of FIG. 4.

Referring to FIG. 5, at a time t1 when a command signal occurs at the output of the comparator 26, the first timer 271 is triggered by the leading or upward edge of the command signal to change its output to high, as shown in FIG. 5(a), causing the actuation of the glow plug 9 to increase the temperature in the combustion cylinder 6 to a level sufficient to ignite an air-fuel mixture therein. This condition continues for a time (T1) set in the first timer 271. On the other hand, the second timer 274 assumes a first state having a low output until a time (T2), which is set in the delay circuit 272, elapses, as shown in FIG. 5(b). When the time (T2) elapses, the second timer 274 changes to a second state having a high output, as shown in FIG. 5(b), causing the three-way valve 16 to shift to the second position supplying air into the mixture conduit 8 and the fuel pump 14 to supply fuel to the fuel injection valve 10. The high output of the second timer 274 also causes the gate circuit 277 to pass fuel injection pulses from the pulse generator 278 to the fuel injection valve 10, as shown in FIG. 5(c), so as to supply fuel to the mixture conduit 8. The second state of the second timer 274 is held for a time (T3) set in the second timer 274. It is to be noted that the time (T2) is shorter than the time (T1) and the time (T1) is shorter than the time (T2) plus the time (T3).

The operation is as follows:

Assuming now that the amount of the particles collected in the trap 4 is below the limit, the pressure differential across the trap 4 is below the threshold value and thus the output of the comparator 26 remains low. As a result, the control circuit 27 maintains the burner 5 out of operation by holding the glow plug 9 deenergized, the three-way valve 16 in its first position, the fuel pump 14 deenergized, and the fuel injection valve 10 out of operation.

When the amount of the particles collected in the trap 4 reaches the limit, the pressure differential across the trap 4 reaches the threshold value and thus the output of the comparator 26 changes to high. This causes the control circuit 27 to operate the burner 5 to regenerate the trap 4 by immediately actuating the glow plug 9 while actuating the fuel pump 14, operating the fuel injection valve 10, and changing the three-way valve 16 to the second position so as to supply an air-fuel mixture to the combustion cylinder 6 with a delay during which the glow plug 9 increases the temperature to a level sufficient to ignite the air-fuel mixture in the presence of excess oxygen included in the exhaust gases.

The control circuit 27 deenergizes the glow plug 9 a predetermined time after its actuation and thereafter deenergizes the fuel injection valve 10 and the fuel pump 14 while at the same time returns the three-way valve 16 to the first position, thereby terminating the trap regeneration.

Referring to FIG. 6, a modification of the embodiment of FIG. 2 is illustrated with the same elements being designated by the same reference numerals. In this modification, the control unit 23 is arranged to determine, at constant intervals, the occurrence of regeneration requirement; that is, the pressure differential ($\Delta P$) across the trap exceeding the threshold value and to operate the burner 5 so as to regenerate the trap only when the number of times of occurrence of regeneration requirement exceeds a predetermined value for a predetermined period of time. This arrangement is effective to increase the reliability of determination of trap regeneration. For this purpose, the control unit 23 includes a frequency determining circuit 30 which is interposed between the comparator 26 and the control circuit 27. The frequency determining circuit 30 counts the command signal (high signal) from the comparator 26 at constant intervals and generates at its output a high signal when the frequency of the counted command signal exceeds a predetermined value.

Figure 7:
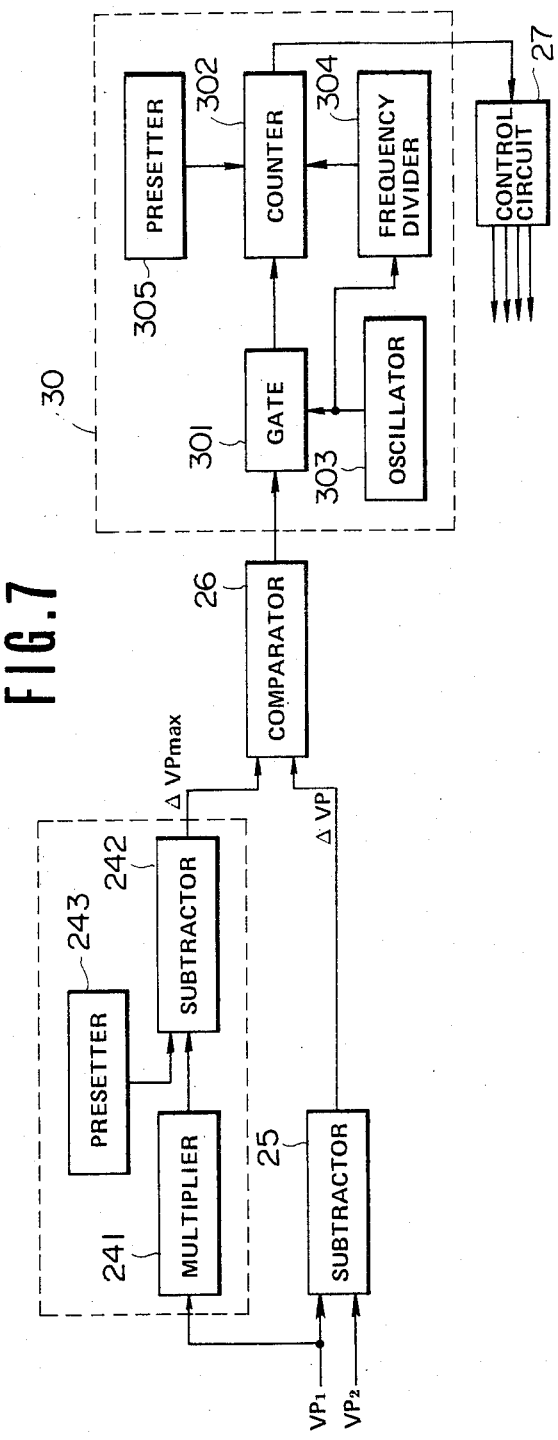
FIG. 7 is a schematic block diagram showing the details of the control unit of FIG. 6.

Referring to FIG. 7, the frequency determining circuit 30 includes a gate circuit 301 which couples the output of the comparator 26 to a counter 302 each time a pulse is applied thereto from an oscillator 303 which generates pulses at a predetermined repetitive period. Preferably, a sample-hold circuit is provided between the gate circuit 301 and the counter 302 in order to avoid malfunction of the counter 302. A frequency divider 304 receives pulses from the oscillator 303 and provides a series of pulses at a repetitive period n times that of the pulses from the oscillator 303 to the counter 302. The counter 302 is a presettable counter which is responsive to the leading edge of a pulse from the frequency divider 304 to start counting down by one step from a count loaded by a preset circuit 305 each time the gate circuit 301 opens to apply the high signal from the comparator 26 to the counter 302. If the count of the counter 302 reaches zero, the output of the counter 302 changes to high, causing the control circuit 27 to operate the burner 5 in the same manner as described in connection with the embodiment of FIG. 2. The counter 302 is responsive to the trailing edge of the pulse from the frequency divider 304 to be loaded again with the initial count from the preset circuit 305.

Assuming now that the oscillator 303 generates a series of pulses at a repetitive period of 1 second, the dividing ratio of the frequency divider 304 is 10, and the count to be loaded to the counter 302 from the preset circuit 305 is 8, the control unit 23 will determine regeneration requirement at constant intervals of 1 second and operate the burner to regenerate the trap when 8 or more regeneration requirements occur for 10 seconds.

It is to be noted that the control unit 23 may be arranged to determine, at constant intervals, a ratio ($\Delta P/P1$) of the pressure differential ($\Delta P$) across the trap to the pressure (P1) on the inlet side of the trap or a ratio (P2/P1) of the pressure (P2) on the outlet side of the trap to the pressure (P1) on the inlet side of the trap and to operate the burner 5 so as to regenerate the trap when the number of times of the determined ratio exceeds a predetermined value for a predetermined period of time.

Figure 8:
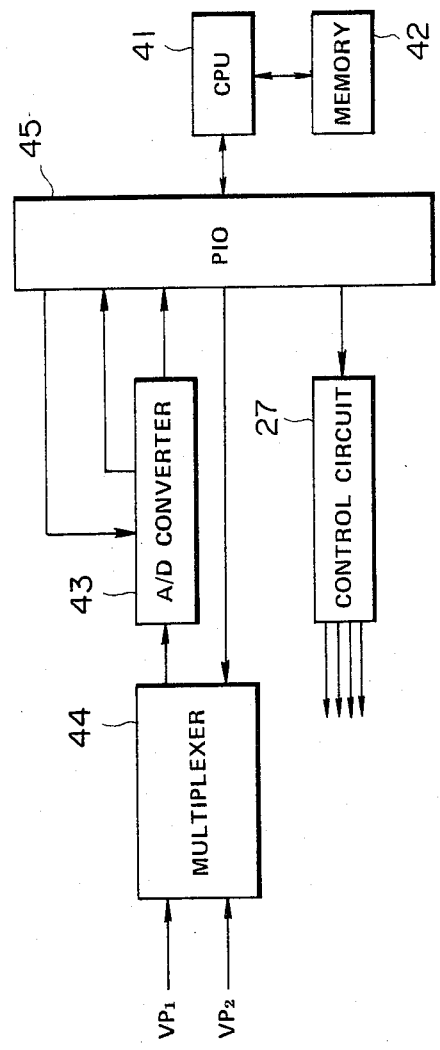
FIG. 8 is a schematic block diagram showing another modification of the embodiment of FIG. 2.

Referring to FIG. 8, another modification of the embodiment of FIG. 2 is illustrated which differs from the modification of FIG. 6 only in that the control unit 23 includes a digital computer capable of performing the arithmetic calculation of addition, subtraction, multiplication, and division on binary numbers. The digital computer comprises a central processing unit 41 in which the actual arithmetic calculations are performed and a memory 42. An analog-to-digital converter 43 is used to convert the analog sensor signals comprising the inputs ($V_{P1}$, $V_{P2}$) to an analog multiplexer 44 into digital form. A peripheral input/output device 45 interconnects the digital computer central processing unit 41 and its memory with the analog-to-digital converter 43 and the analog multiplexer 44 and also with the control circuit 27.

Figure 9:
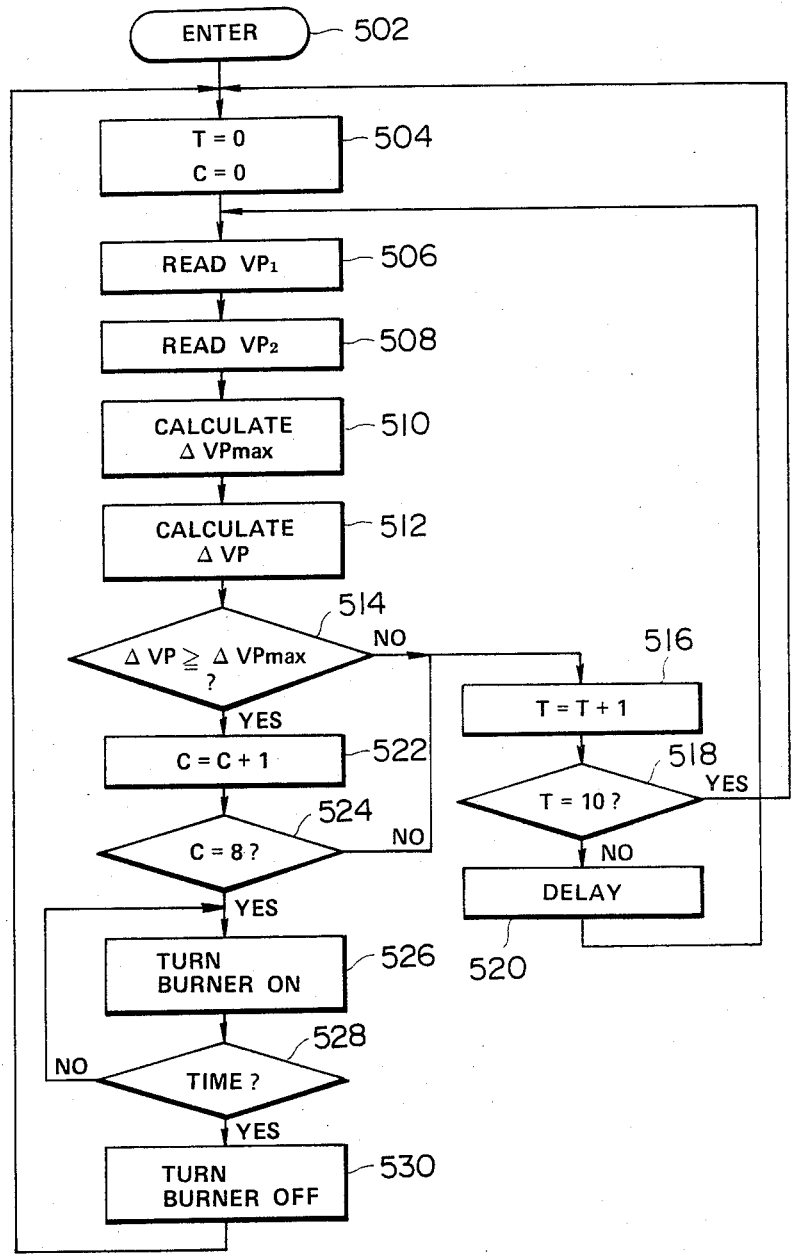
FIG. 9 is a flow diagram illustrative of the operation of the digital computer used in the control unit of FIG. 8.

FIG. 9 is a flow diagram of the programming of the digital computer of FIG. 8, wherein it is assumed for illustrative purposes only that the burner is actuated to regenerate the trap 4 when 8 regeneration requirements occur for 10 seconds during which 10 data samplings are repeated at constant intervals of 1 second.

The computer program is entered at the point 502. At the point 504 in the program, the digital computer central processing unit clears the first counter whose count T represents the number of times of data sampling cycle and clears the second counter whose count C represents the number of times of occurrence of regeneration requirement. Following this, the inputs to the analog multiplexer 44 are, one by one, converted by the analog-to-digital converter 43 into digital form and read into the computer memory. Thus, at the point 506 in the program, the value of the voltage signal ($V_{P1}$) from the first pressure sensor 21 is converted into digital form and read into the computer memory. Similarly, at the point 508, the value of the voltage signal ($V_{P2}$) from the second pressure sensor 22 is converted to digital form and read into computer memory.

At the point 510, the threshold value ($\Delta V_{Pmax}$) of pressure differential across the particle collector is arithmetically calculated by multiplying the read value ($V_{P1}$) by a constant A and subtracting a constant B from the resulting product. At the following point 512, the value ($\Delta V_P$) of pressure differential existing across the particle collector is arithmetically calculated by subtracting the read value ($V_{P2}$) from the read value ($V_{P1}$).

At the point 514 in the computer program, a determination is made as to whether the calculated pressure differential value ($\Delta V_P$) is equal to or greater than the calculated threshold value ($\Delta V_{Pmax}$). If the answer to this question is "no", then the program proceeds to the point 516 where the digital computer central processing unit causes the first counter to count up by one step. Following this, the program proceeds to a determination at the point 518. This determination is whether or not the count T of the first counter reaches 10. If the answer to this question is "yes", then the program returns to the point 504 where the first and second counters are cleared to zero. Otherwise, the program proceeds to the point 520 and returns to the point 506 after a constant delay. The purpose of the point 520 is to keep the data sampling cycle interval at one second.

If the answer to the question at the point 514 is "yes", then a regeneration requirement occurs and the program proceeds to the point 522 where the digital computer central processing unit causes the second counter to count up by one step. Following this, a determination is made at the point 524. This determination is whether or not the count C of the second counter reaches 8. If the answer to this question is "no", then the program proceeds to the previously described point 516. Otherwise, the program proceeds to the point 526 where the burner is actuated to regenerate the particle collector.

At the following point 528, a determination is made as to whether the time period of operation of the burner reaches a predetermined value. If the answer to this question is "no", the program returns to the point 526 where the burner is actuated. Otherwise, the program proceeds to the point 530 where the digital computer central processing unit generates a command to stop the burner operation and then returns to the point 504.

Figure 10:
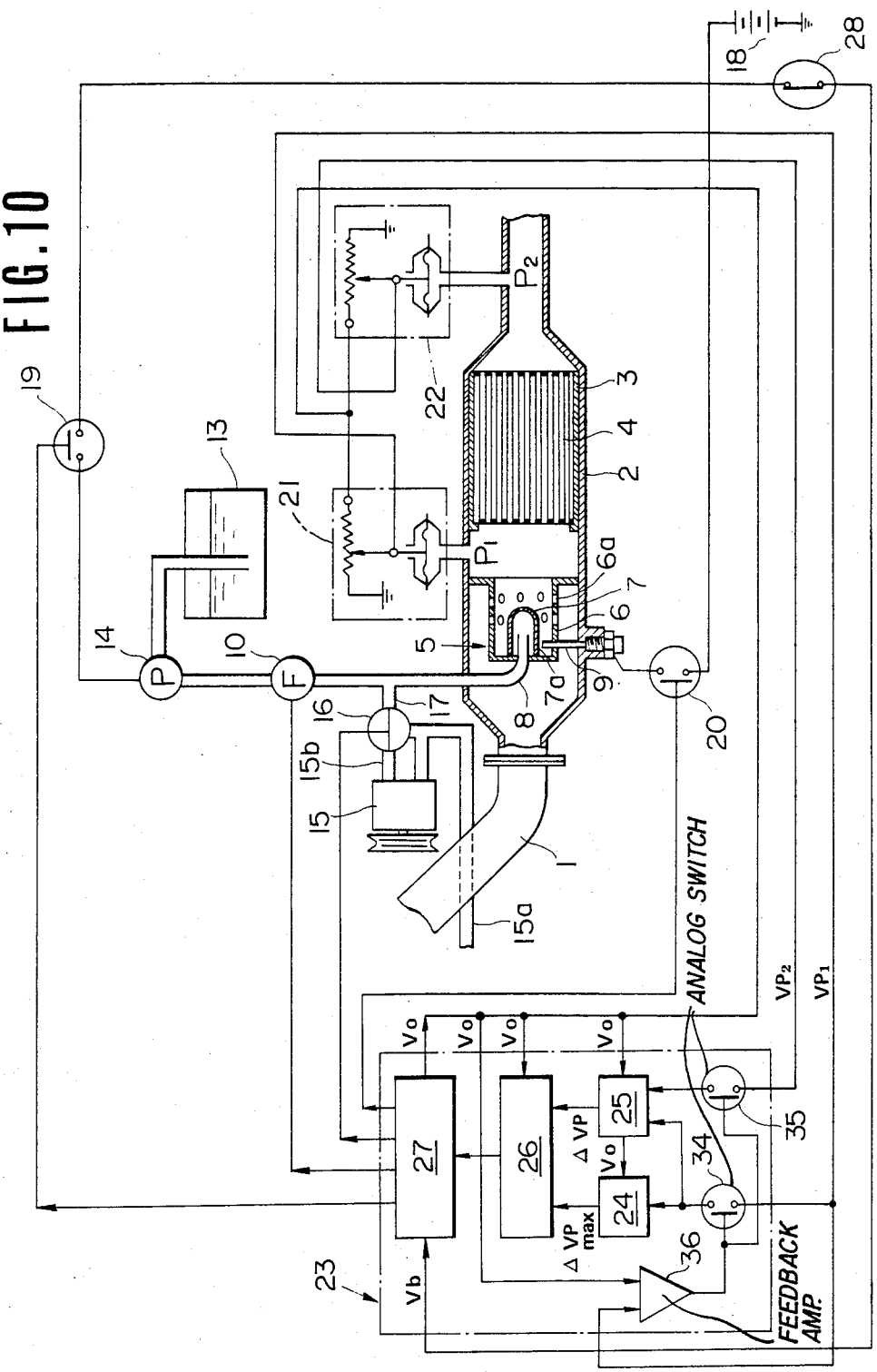
FIG. 10 is a schematic block diagram partially in section showing a second embodiment of the present invention.

Referring to FIG. 10, there is illustrated a further embodiment of the present invention which is generally the same as shown in FIG. 2 except for the control unit arrangement. Accordingly, parts in FIG. 10 which are like those in FIG. 2 have been given the same reference character.

The control unit 23 comprises a threshold value determining circuit 24 which has an input through an analog switch 34 from the first pressure sensor 21 and generates a voltage signal ($\Delta V_{Pmax}$) indicative of a threshold value of pressure differential across the trap 4. The output of the threshold value determining circuit 24 is coupled to one input of a comparator 26 which has another input from a pressure differential determining circuit 25. The pressure differential determining circuit 25 has an input through the analog switch 34 from the first pressure sensor 21 and another input through an analog switch 35 from the second pressure sensor 22 and generates a voltage signal ($\Delta V_P$) indicative of pressure differential (P1−P2) existing across the trap 4. The comparator 26 compares the voltage signal ($\Delta V_P$) from the pressure differential determining circuit 25 with the voltage signal ($\Delta V_{Pmax}$) from the threshold value determining circuit 24 and generates a command signal (high signal) when the former is equal to or greater than the latter; that is, when the pressure differential existing across the trap 4 reaches the threshold value. The output of the comparator 26 is coupled to a control circuit 27 which closes the relay switches 19 and 20, operates the fuel injection valve 10, and changes the three-way valve 16 to the second position in response to a command signal from the comparator 26.

A feedback amplifier 36 has an input from the first pressure sensor 21 and generates an "on" signal to close the analog switches 34 and 35 when the voltage signal ($V_{P1}$) exceeds a predetermined value.

The control circuit 27 includes a constant-voltage circuit connected through the engine key switch 28 to the battery 18 to supply a constant voltage (Vo) to the power terminals of the threshold value calculating circuit 24, the pressure differential calculating circuit 25, the comparator 26, and the feedback amplifier 36.

Referring to FIG. 11, the threshold value determining circuit 24 may be comprised of a multiplier 241, a subtractor 242, and a preset circuit 243. The multiplier 241 multiplies the output voltage ($V_{P1}$) of the first pressure sensor 21 by a constant A and generates a voltage signal ($A.V_{P1}$) indicative of the resulting product. The output of the multiplier 241 is coupled to one input of the subtractor 242 which has another input from the preset circuit 243. The subtractor 242 subtracts a constant B preset in the preset circuit 243 from the voltage signal ($A.V_{P1}$) applied thereto from the multiplier 241 and generates a voltage signal ($\Delta V_{Pmax}$) indicative of the resulting difference ($A.V_{P1}-B$). In addition, the pressure differential calculating circuit 25 may be comprised of a subtractor 250 which subtracts the output voltage ($V_{P2}$) of the second pressure sensor 22 from the output voltage ($V_{P1}$) of the first pressure sensor 21 and generates a voltage signal ($\Delta V_P$) indicative of the resulting difference.

The control circuit 27 may include a first timer 271 which is connected at its input to the output of the comparator 26. The output of the first timer 271 is coupled to a relay 273 which controls the relay switch 20. The first timer 271 is responsive to a command signal (high signal) from the comparator 26 to energize the relay 273 so as to close the relay switch 20, causing actuation of the glow plug 9 for a predetermined period of time (T1) after the application of the command signal from the comparator 26 or in response to the leading edge of the command signal from the comparator 26. The control circuit 27 also includes a second timer 274 which is connected at its input to the output of the comparator 26 through a delay circuit 272. The output of the second timer 274 is coupled to a relay 275 which controls the three-way valve 16 and to a relay 276 which controls the relay switch 19. The delay circuit 272 delays application of the command signal to the second timer 274 by a predetermined time T2. The second timer 274 is responsive to the command signal fed thereto through the delay circuit 272 to energize the relay 275 so as to shift the three-way valve 16 to the second position supplying air to the mixture conduit 8 and also to energize the relay 276 so as to close the relay switch 19, causing the fuel pump 14 to start the supply of fuel to the fuel injection valve 10. The output of the second timer 274 is also connected to a gate circuit 277 which is responsive to a high signal from the second timer 274 to allow the passage of fuel injection pulses from a pulse generator 278 to an amplifier 279. The output of the amplifier 279 is coupled to the fuel injection valve 10 which receives the fuel injection pulses and operates to supply fuel into the mixture conduit 8.

Referring to FIG. 12, at a time t1 when a command signal occurs at the output of the comparator 26, the first timer 271 is triggered by the leading or upward edge of the command signal to change its output to high, as shown in FIG. 12(a), causing the glow plug 9 to go on so as to increase the temperature in the combustion cylinder 6 to a level sufficient to ignite an air-fuel mixture therein. This condition continues for a time (T1) set in the first timer 271. On the other hand, the second timer 274 assumes a first state having a low output until a time (T2), which is set in the delay circuit 272, elapses, as shown in FIG. 3'(b). When the time (T2) elapses, the second timer 274 changes to a second state having a high output, as shown in FIG. 12(b), causing the three-way valve 16 to shift to the second position supplying air into the mixture conduit 8 and the fuel pump 14 to supply fuel to the fuel injection valve 10. The high output of the second timer 274 also causes the gate circuit 277 to pass fuel injection pulses from the pulse generator 278 to the fuel injection valve 10, as shown in FIG. 12(c), so as to supply fuel to the mixture conduit 8. The second state of the second timer 274 continues for a time (T3) set in the second timer 274. It is to be noted that the time (T2) is shorter than the time (T1) and the time (T1) is shorter than the time (T2) plus the time (T3).

Referring back to FIG. 11, the feedback amplifier 36 may comprise a comparator 361 which has an input from a preset circuit 362 and another input from the first pressure sensor 21. When the voltage signal ($V_{P1}$) from the first pressure sensor 21 is equal to or greater than a value preset in the preset circuit 362, the output of the comparator 361 is high to close the analog switches 34 and 35. Under the other conditions, the output of the comparator 361 remains low to open both of the analog switches 34 and 35 so as to prevent the burner 5 from operating to regenerate the particle collector 4.

The operation is as follows:

Assuming now that the amount of the particles collected in the trap 4 is below the limit, the pressure differential across the trap 4 is below the threshold value and thus the output of the comparator 26 remains low. As a result, the control circuit 27 maintains the burner 5 out of operation by holding the glow plug 9 deenergized, the three-way valve 16 in its first position, the fuel pump 14 deenergized, and the fuel injection valve 10 out of operation.

When the amount of the particles collected in the trap 4 reaches the limit, the pressure differential across the trap 4 reaches the threshold value and thus the output of the comparator 26 changes to high. This causes the control circuit 27 to operate the burner 5 to regenerate the trap 4 by immediately actuating the glow plug 9 while actuating the fuel pump 14, operating the fuel injection valve 10, and changing the three-way valve 16 to the second position so as to supply an air-fuel mixture to the combustion cylinder 6 with a delay during which the glow plug 9 increases the temperature to a level sufficient to ignite the air-fuel mixture in the presence of excess oxygen included in the exhaust gases.

The control circuit 27 deenergizes the glow plug a predetermined time after its actuation and thereafter deenergizes the fuel injection valve 10 and fuel pump 14 while at the same time returns the three-way valve 16 to the first position, thereby terminating the trap regeneration.

If the pressure (P1) on the inlet side of the trap 4 is below a predetermined value such as at low speed and/or low loads, the output of the feedback amplifier 36 remains low to open the analog switches 34 and 35 so as to disconnect the first pressure sensor 21 from the threshold value determining circuit 24 and from the pressure differential determining circuit 25 and to disconnect the second pressure sensor 22 from the pressure differential determining circuit 25. As a result, the comparator 26 generates no command signal to prevent the control circuit 27 from operating the burner 5.

This embodiment is effective to avoid waste of fuel resulting from unnecessary trap regeneration caused by inaccurate regeneration requirements which sometimes occur at low speeds and/or low loads.

It is to be noted that the control unit 23 may be arranged to determine the regeneration requirement by comparing the ratio ($\Delta P/P1$) of the pressure differential ($\Delta P$) to the pressure (P1) on the inlet side of the trap or the ratio (P2/P1) of the pressure (P2) on the outlet side of the trap to the pressure (P1) on the inlet side of the trap with a predetermined value and to operate the burner to regenerate the trap when the determined ratio ($\Delta P/P1$) or (P2/P1) exceeds the predetermined value. In addition, it is to be noted that the control unit 23 may be arranged to determine, at constant intervals, the occurrence of regeneration requirement; that is, the pressure differential ($\Delta P$) across the trap exceeding the threshold value and to operate the burner 5 so as to regenerate the trap only when the number of times of occurrence of regeneration requirement exceeds a predetermined value for a predetermined period of time, as described in connection with FIGS. 6 and 8.

Referring to FIG. 13, a modification of the embodiment of FIG. 10 is illustrated with the same elements being designated by the same reference numerals. The control unit 23 includes a pressure changing rate detection circuit 38 which has an input from the first pressure sensor 21 and generates a high signal when the rate of change of the voltage signal ($V_{P1}$) from the first pressure sensor 21 is equal to or smaller than a predetermined value. The output of the pressure changing rate detection circuit 38 is coupled to a feedback amplifier 39 which is substituted for the feedback amplifier 36 of FIG. 10. The feedback amplifier 39 has another input from the first pressure sensor 21 and generates a high signal to close both of the analog switches 34 and 35 upon the occurrence of two conditions; namely, when the voltage signal ($V_{P1}$) is equal to or greater than a predetermined value and when the rate of change of the voltage signal ($V_{P1}$) is equal to or smaller than a predetermined value. Under the other conditions, the output of the feedback amplifier 39 remains low to open both of the analog switches 34 and 35 so as to prevent the burner 5 from operating to regenerate the particle collector 4. This modification can increase the accuracy of regeneration control by inhibiting particle collector regeneration under rapid acceleration and rapid deceleration conditions.

Figure 14:
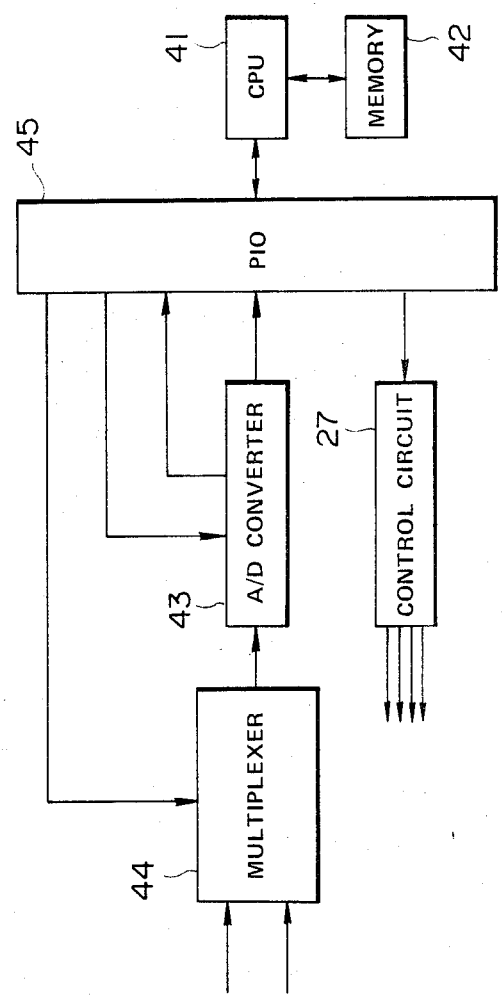
FIG. 14 is a schematic block diagram showing another modification of the embodiment of FIG. 10.

Referring to FIG. 14, another modification of the embodiment of FIG. 10 is illustrated wherein the control unit 23 comprises a digital computer capable of performing the arithmetic calculations of addition, subtraction, multiplication, and division on binary numbers. The digital computer comprises a central processing unit 41 in which the actual arithmetic calculations are performed and a memory 42. An analog-to-digital converter 43 is used to convert the analog sensor signals comprising the inputs ($V_{P1}$, $V_{P2}$) to an analog multiplexer 44 into digital form. A peripheral input/output device 45 interconnects the digital computer central processing unit 41 and its memory 42 with the analog-to-digital converter 43 and the analog multiplexer 44 and also with the control circuit 27.

FIG. 15 is a flow diagram of the programming of the digital computer of FIG. 14. The computer program is entered at the point 602. At the point 604, the value ($V_{P1}$) of the voltage signal from the first pressure sensor 21 is converted to digital form and read into the computer memory. At the following point 606, the read value is shifted into a registor A. After a predetermined delay at the point 608, the value ($V_{P1}$) of the voltage signal from the first pressure sensor 21 is again converted to digital form and read into the computer memory at the point 610. At the following point 612, the read value is shifted into a registor B.

Following this, the program proceeds to a determination point 614. This determination is whether or not the rate of change of the voltage signal from the first pressure sensor 21 (namely, the absolute value of the difference between the values stored in the registors A and B) is equal to or smaller than a predetermined value $\alpha$. If the answer to this question is "no", then the program returns to the point 604. Otherwise, another determination is made as to whether the value stored in the registor B is equal to or greater than a predetermined value $\beta$. If the answer to this question is "no", then the program returns to the point 60. Otherwise, the program proceeds to another determination point 618. This determination is whether a regeneration requirement occurs; that is, whether the difference ($V_{P1} - V_{P2}$) indicative of the pressure differential existing across the particle collector 4 is equal to or greater than the threshold value ($\Delta V_{Pmax} = A.V_{P1} - B$). If the answer to this question is "no", then the program returns to the point 604. Otherwise, the program proceeds to the point 620 where the burner is actuated to regenerate the particle collector 4 for a predetermined period of time. Following this, the program returns to the point 604.

Although the present invention has been described in connection with specific embodiments thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. An apparatus for use in an internal combustion engine having an exhaust conduit for discharging exhaust particles together with exhaust gases to the atmosphere, and a trap located in said exhaust conduit for collecting exhaust particles, said apparatus comprising:
   regenerative means operable to regenerate said trap;
   sources for deriving signals indicative of a first condition representative of the presence (P1) on the inlet side of said trap and a second condition representative of the pressure (P2) on the outlet side of said trap; and
   a control means responsive to the signals indicative of the first and second conditions for detecting a regeneration requirement to operate said regenerative means for a predetermined time period, said control means including:
   means for calculating a pressure differential ($\Delta P$) across said trap as a function of the values of the signals indicative of the first and second conditions;
   means for calculating a threshold value ($\Delta Pmax$) based upon the value of the signal indicative of the first condition; and
   means for detecting a regeneration requirement when the calculated pressure differential ($\Delta P$) reaches the calculate threshold value ($\Delta Pmax$).

2. The apparatus of claim 1, wherein said means for calculating a threshold value based upon the value of the signal indicative of (a) includes means for calculating the threshold value ($\Delta Pmax$) from the following equation:

$$\Delta Pmax = A \cdot P1 - B$$

wherein A and B are constants.

3. The apparatus of claim 2, wherein the constant (B) is zero.

4. The apparatus of claim 2, wherein said means for calculating a threshold value based upon the value of the signal indicative of the first condition includes:
means responsive to the signal indicative of the first condition for generating a signal indicative of a first difference, between the constant (B) and the value of the signal indicative of said product.

5. The apparatus of claim 4, wherein said means for calculating a rpessure differential across said trap includes means responsive to the signals indicative of the first and second conditions for generating a signal indicative of a second difference, between the value of the signal indicative of said second condition and the value of the signal indicative of said first condition.

6. The apparatus of claim 5, wherein said means for detecting said regenerative requirement includes means responsive to the signals indicative of said first and second differences for detecting the regeneration requirement when the value of the signal indicative of the second difference reaches the value of the signal of the first difference.

7. The apparatus of claim 1, which further comprises means responsive to the signal indicative of said first condition for preventing said control means for detecting a regeneration requirement when the value of the signal indicative of said first condition is below a predetermined value.

8. The apparatus of claim 7, wherein said means responsive to the signal indicative of said first condition for preventing said control means from detecting a regeneration requirement includes:
means responsive to the signal indicative of said first condition for generating an "off" signal when the value of the signal indicative of said first condition is below a predetermined value;
means responsive to the "off" signal for disconnecting the signal indicative of said first condition from said means for calculating a pressure differential across said trap and also from said means for calculating a threshold value; and
means responsive to the "off" signal for disconnecting the signal indicative of said second condition from said means for calculating a pressure differential across said trap.

9. The apparatus of claim 1, wherein said control means further comprises means responsive to the signal indicative of the first condition for preventing said control circuit from detecting a regeneration requirement when the rate of change of the value of the signal indicative of the first condition is above a predetermined value.

10. The apparatus of claim 9, wherein said means responsive to the signal indicative of said first condition for preventing said control means from detecting a regeneration requirement includes:
means responsive to the signal indicative of said first condition for generating an "off" signal when the value of the signal indicative of said first condition is below a predetermined value;
means responsive to the "off" signal for disconnecting the signal indicative of said first condition from said means for calculating a pressure differential across said trap and also from said means for calculating a threshold value; and
further means responsive to the "off" signal for disconnecting the signal indicative of said second condition from said means for calculating a pressure differential across said trap.

11. An apparatus for use in an internal combustion engine having an exhaust conduit for discharging exhaust particles together with exhaust gases to the atmosphere, and a trap located in said exhaust conduit for collecting exhaust particles, said apparatus comprising:
regenerative means responsive to a regeneration command signal for regenerating said trap;
sources for deriving signals indicative of a first condition represnetative of the pressure (P1) on the inlet side of said trap and a second condition representative of the pressure (P2) on the outlet side of said trap;
a control circuit responsive to the signals indicative of said first and second conditions for generating a regeneration command signal to said regenerative means for a predetermined time period, said control circuit including:
means for calculating a pressure differential ($\Delta P$) across said trap based upon the values of the signals indicative of the first and second conditions;
means for calculating a threshold value ($\Delta Pmax$) based upon the value of the signal indicative of the first condition;
means for detecting a regeneration requirement when the calculated pressure differential ($\Delta P$) reaches the calculated threshold value ($\Delta Pmax$);
means for counting the number of occurrences of the regeneration requirement detection at constant time intervals; and
means for generating the regenration command signal to said regenerative means when the counted number reaches a predeterdmined value for a predetermined time period.

12. The apparatus of claim 11, wherein said means for detecting said regeneration requirement includes means for generating a regeneration requirement indicative signal when the calculated pressure differential ($\Delta P$) reaches the calculated 4d threshold value ($\Delta Pmax$).

13. The apparatus of claim 12, wherein said means for counting the number of occurrences of the regeneration requirement detection at constant time intervals includes:
a counter operable to count the number of times the regeneration requirement indicative signal is received and further operable to generate the regeneration command signal when a count of said counter reaches a predetermined value for the predetermined time period; and
means for providing an electrical connection of said counter to said means for generating a regeneration requirement indicative signal at constant time intervals.

14. The apparatus of claim 13, wherein said means for providing an electrical connection of said counter to said means for generating a regeneration requirement indicative signal at constant time intervals includes:
a pulse generator for generating a series of pulses at a predetermined repetitive rate; and
means for connecting said counter to said means for generating a regeneration requirement indicative signal each time a pulse is applied thereto from said pulse generator.

15. The apparatus of claim 14, wherein said counter is operable to count down by one step from a predetermined count each time said pulse generator generates a predetermined number of pulses, said counter being operable to generate the regeneration command signal when the count of said counter reaches zero.

16. The apparatus of claim 11, wherein said means for calculating a threshold value includes means for calculating the threshold value (AΔPmax) from the following equation:

$$\Delta Pmax = A \cdot P1 - B$$

wherein A and B are constants.

17. The apparatus of claim 16, wherein the constant (B) is zero.

18. The apparatus of claim 16, wherein said means for calculating a threshold value further includes:
means responsive to the signal indicative of the first condition for generating a signal indicative of a product of the constant (A) by the value of the signal indicative of the first condition; and
means responsive to the signal indicative of said product for generating a signal indicative of a first difference, between the constant (B) and the value of the signal indicative of said product.

19. The apparatus of claim 18, wherein said means for calculating a pressure differential across said trap includes means responsive to the signal indicative of the first and second conditions for generating a signal indicative of a second difference, between the value of the signal indicative of said second condition and the value of the signal indicative of the first condition.

20. The apparatus of claim 19, wherein said detecting means for detecting the regeneration requirement includes means responsive to the signals indicative of said first and second differences for detecting the regeneration requirement when the value of the signal indicative of the first difference reaches the value of the signal indicative of the second difference.

21. A method of controlling operation of a regenerative means to generate a quantity of heat to burn exhaust particles collected in a rap located in an exhaust conduit of an internal combustion engine, comprising the steps of:
measuring a pressure (P1) on an inlet side of said trap;
measuring a pressure (P2) on an outlet side of said trap;
calculating a pressure differential (ΔP) across said trap based upon the measured pressures (P1) and (P2);
calculating a threshold value (ΔPmax) as a function of the measured inlet pressure (P1);
comparing the calculated pressure differential (ΔP) with the calculated threshold value (ΔPmax) to detect a regeneration requirement when the calculated pressure differential reaches the calculated threshold value;
operating said regenerative means to regenerate said trap in response to the detection of the regeneration requirement.

22. The method of claim 21, wherein the threshold value (ΔPmax) is calculated from the following equation:

$$\Delta Pmax = A \times P1 - B$$

wherein A and B are constants.

23. The method of claim 22, wherein the constant (B) is zero.

24. The method of claim 21, which further comprises the step of preventing said regenerative means from operating to regenerate said trap when the measured pressure (P1) is below a predetermined value.

25. The method of claim 21, which further comprises the step of preventing said regenerative means from operating to regenerate said trap when the measured pressure (P1) is below a predetermined value or when the rate of change of the measured pressure (P1) is above a predetermined value.

26. A method of controlling operation of a regenerative means to generate a quantity of heat to burn exhaust particles collected in a rap located in an exhaust conduit of an internal combustion engine, comprising the steps of:
measuring a pressure (P1) on an inlet side of said trap;
measuring a pressure (P2) on an outlet side of said trap;
calculating a pressure differential (ΔP) across said trap based upon the measured pressures (P1) and (P2);
calculating a threshold value (ΔPmax) as a function of the measured inlet pressure (P1);
comparing the calculated pressure differential (ΔP) with the calculated threshold value (ΔPmax) to detect a regeneration requirement when the calculated pressure differential reaches the calculated threshold value;
counting the number of detections of the regeneration requirement at constant time intervals; and
operating said regenerative means to regenerate said trap when the counter number reaches a predetermined value for a predetermined time period.

27. The method of claim 26, wherein the threshold value (ΔPmax) is calculated from the following equation:

$$\Delta Pmax = A \times P1 - B$$

wherein A and B are constants.

28. The method of claim 27, wherein the constant (B) is zero.

* * * * *

UNITED STATES PATENT AND TRADEMARK OFFICE
CERTIFICATE OF CORRECTION

PATENT NO. : 4,608,640

DATED : August 26, 1986

INVENTOR(S) : SHINZAWA et al

It is certified that error appears in the above-identified patent and that said Letters Patent is hereby corrected as shown below:

On the title page (57) Abstract, last line change "28 Claims, 19 Drawing Figures" to --28 Claims, 15 Drawing Figures--

Signed and Sealed this

Ninth Day of December, 1986

Attest:

DONALD J. QUIGG

Attesting Officer

Commissioner of Patents and Trademarks